Aug. 25, 1959    L. D. HAGENBOOK    2,901,231
PERCUSSIVE CORE BREAKING DEVICE FOR BORING TYPE MINERS
Filed May 5, 1958    4 Sheets-Sheet 1

INVENTOR.
Loy D. Hagenbook
BY
Murray A. Gleeson
ATTORNEY

INVENTOR.
Loy D. Hagenbook
BY
Murray A. Gleeson
ATTORNEY

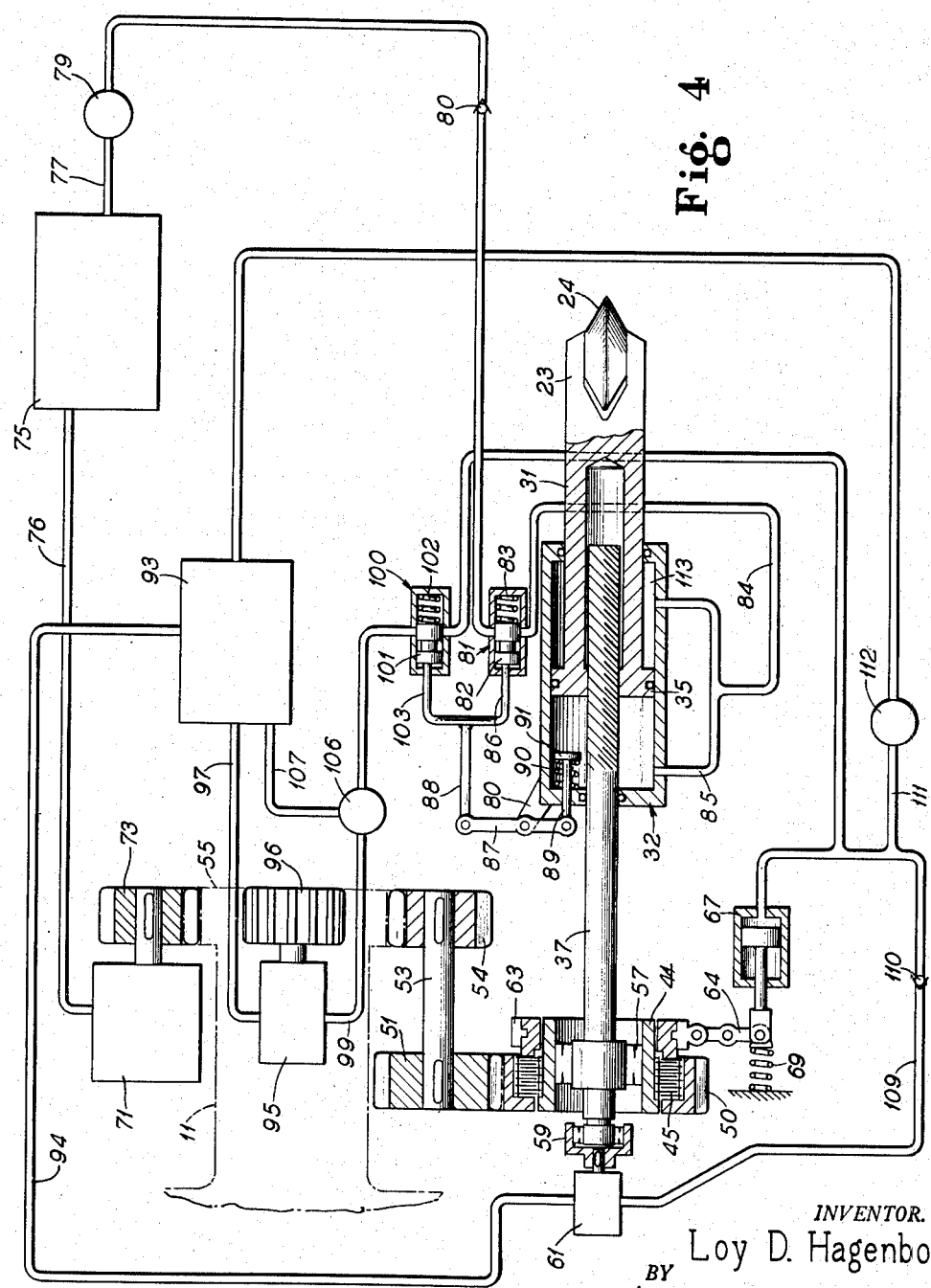

United States Patent Office 2,901,231
Patented Aug. 25, 1959

2,901,231

PERCUSSIVE CORE BREAKING DEVICE FOR BORING TYPE MINERS

Loy D. Hagenbook, Chicago, Ill., assignor to Goodman Manufacturing Company, Chicago, Ill., a corporation of Illinois Application May 5, 1958, Serial No. 732,924

5 Claims. (Cl. 262—7)

This invention relates generally to boring type mining machines and more particularly to a boring head having means incorporated therein for fragmenting the cores formed in a mineral seam between the kerfs cut by the boring head.

Heretofore, boring type mining and tunneling machines have mined out a mineral seam such as coal and the like, by cutting one or more annular kerfs, leaving a core therebetween and by breaking this core by the boring heads during the boring operation. A common method for breaking or fragmenting the core is to exert an outward wedging pressure on the core by means of a wedging roller carried by the boring head, or by a wedging cam on the boring head traveling along an inner kerf cut thereby and wedging the core outwardly into the next outwardly adjacent kerf. The cores have also been broken by applying a crushing roller to the face of the core which by bearing pressure crushes the core into the adjacent kerfs.

While such methods have been generally satisfactory in breaking the cores, the power required to both drive the boring heads and break the cores becomes excessive, particularly where the seam has impurities therein, and such methods frequently break the coal into finer fragments than is desirable for commercial use.

It, accordingly, is a principal object of the present invention to improve upon the core breakers heretofore used in continuous mining machines, by providing percussively driven core breaking devices on the rotary boring heads, delivering axial impact blows to the face of the core.

Another object of the invention is to provide a percussive core breaking device for a rotary boring head in which a rotatable disk, spaced radially from the axis of rotation of the head and movable in an annular path, successively engages the face of the core with a percussive and wedging action.

A further object of the invention is to provide a rotary boring head for a continuous mining machine in which a percussive core breaker is mounted on the boring head in radially spaced relation with respect to the axis of rotation thereof, for engagement with the core with an axial percussive action, dependent upon rotation of the boring head.

These and other objects of the invention will appear from time to time as the following specification proceeds and with reference to the accompanying drawings wherein:

Figure 4 is a schematic diagrammatic view, diagrammatically illustrating the operating mechanism for the percussive core breaking device.

Figure 1:
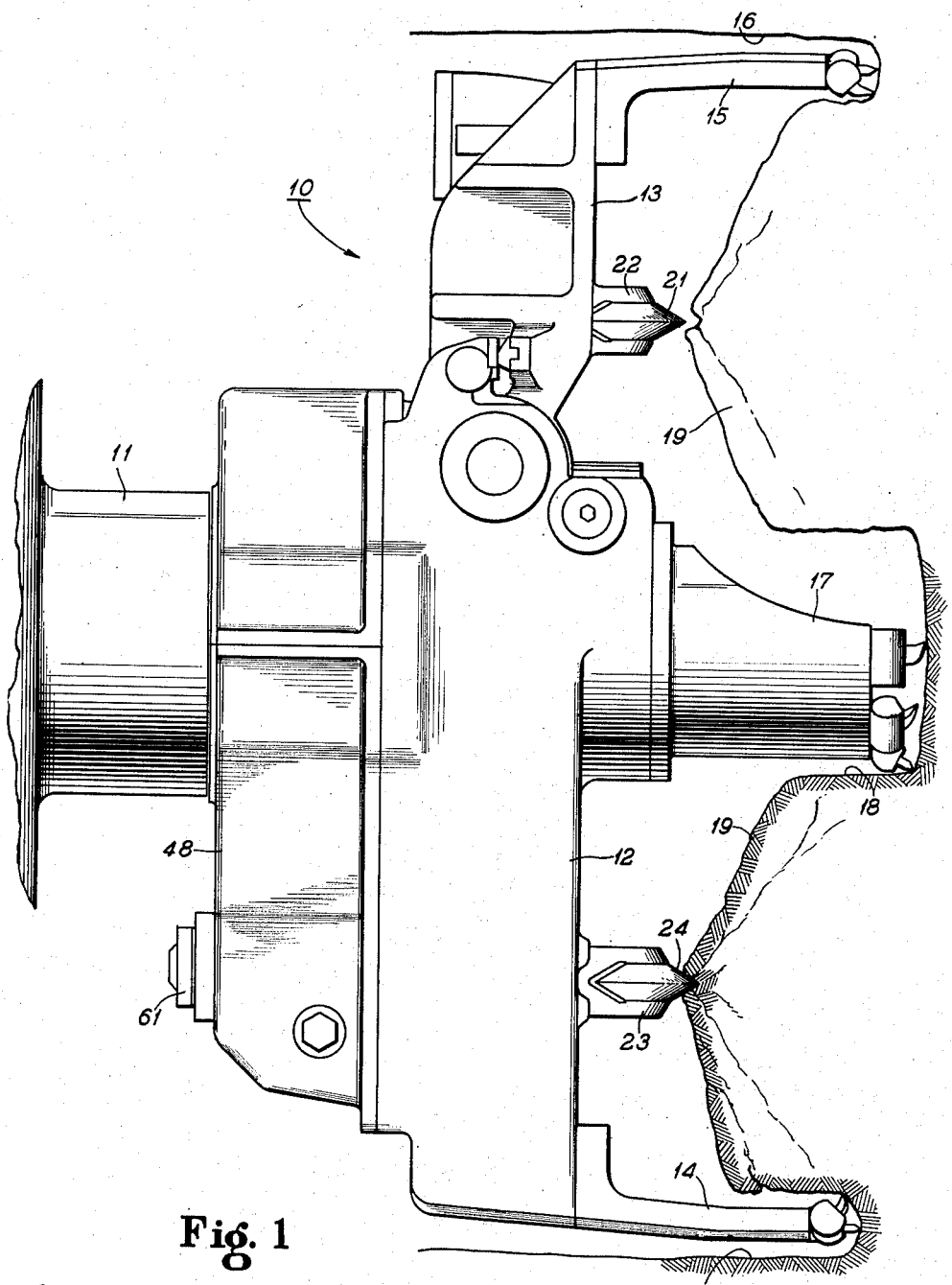
Figure 1 is a view in side elevation of a boring head for a continuous mining machine constructed in accordance with the present invention.
Figure 2:
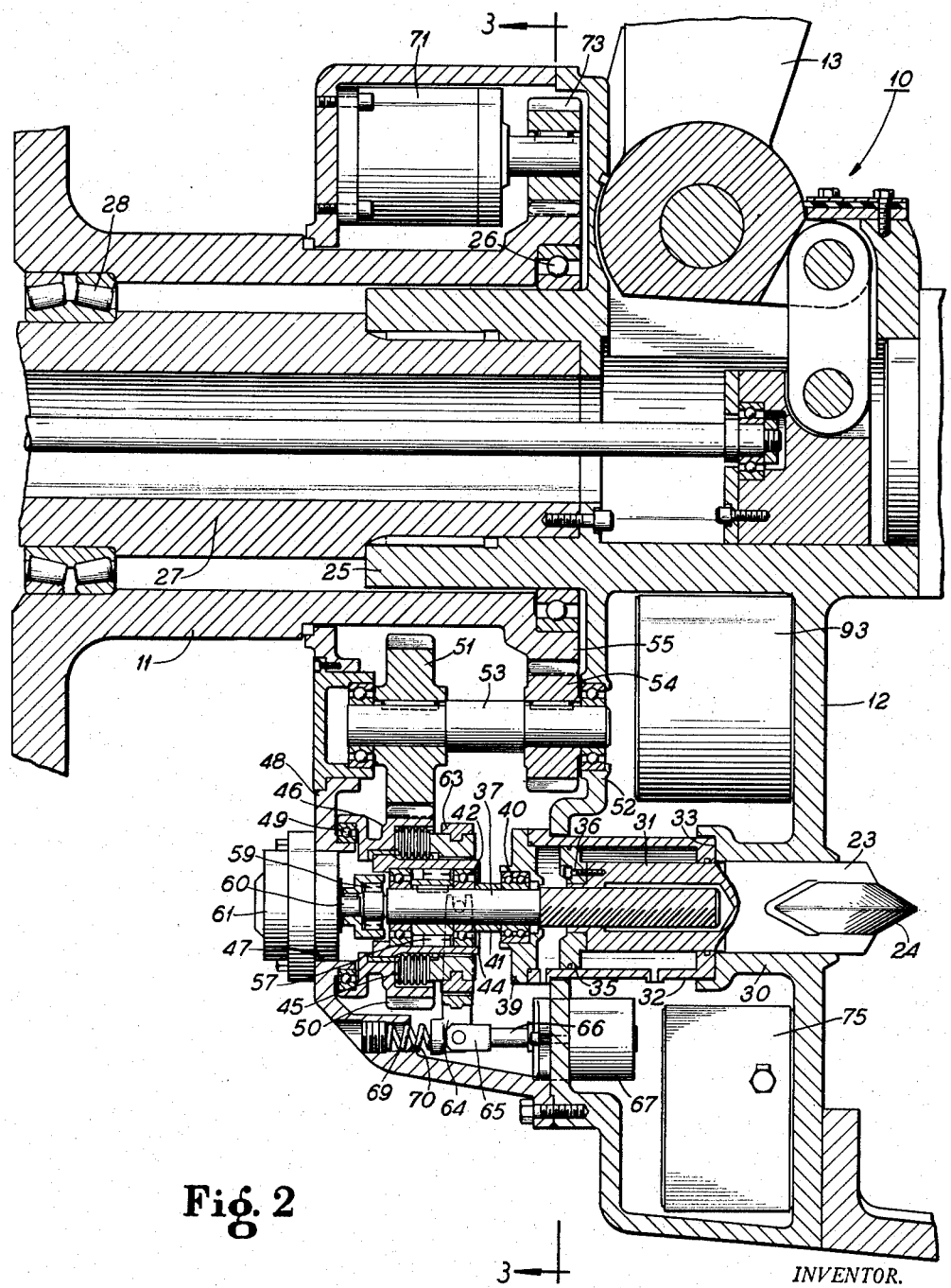
Figure 2 is a fragmentary longitudinal sectional view of the boring head shown in Figure 1, drawn to an enlarged scale.
Figure 3:
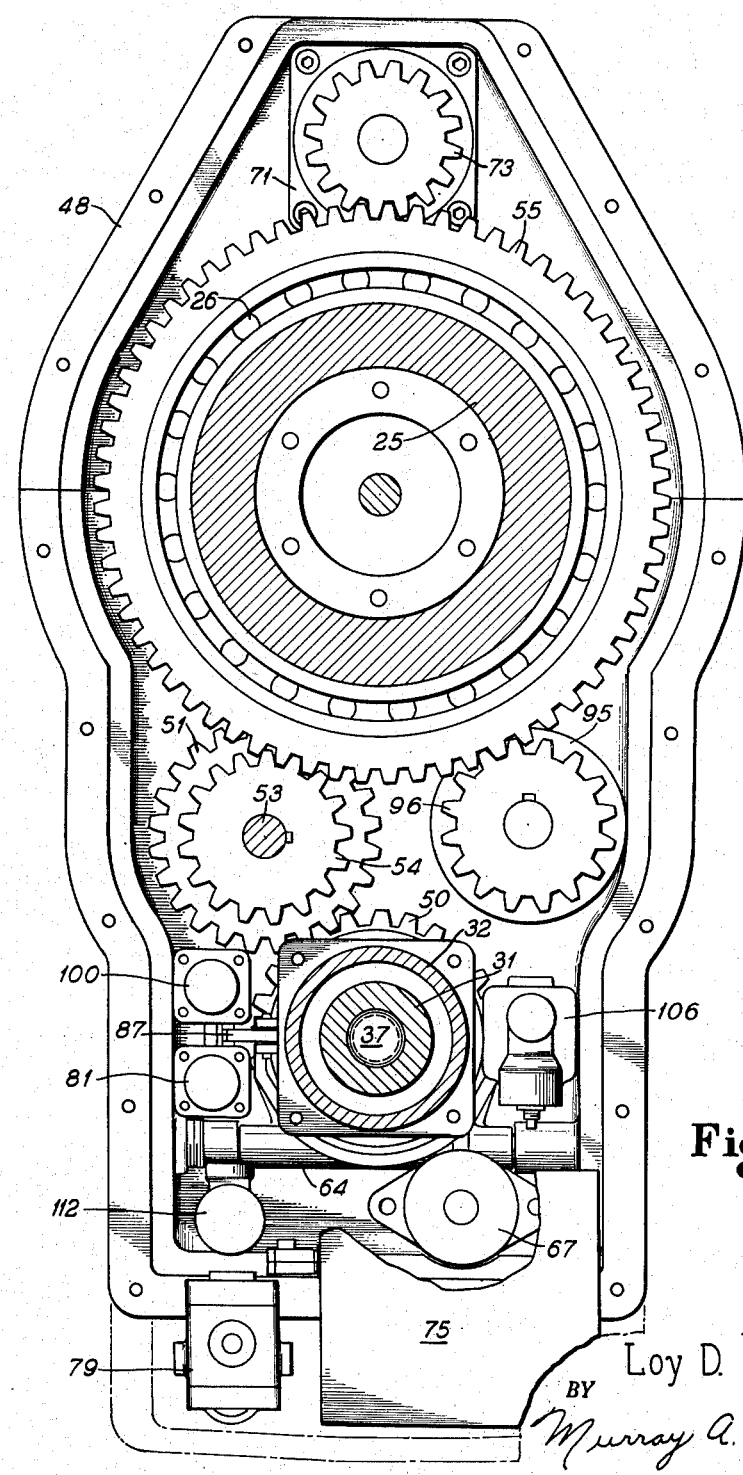
Figure 3 is a partial transverse sectional view taken substantially along line 3—3 of Figure 2.

In the embodiment of the invention illustrated in the drawings, reference character 10 generally designates the boring head of a continuous mining machine of the boring type. As shown in Figures 1 and 2, the boring head 10 is rotatably mounted within a hollow hub 11 extending from a vertically adjustable frame for the machine, as is usual with such mining machines and forms no part of the present invention so not herein shown or described in detail.

The boring head 10 is herein shown as including radially extending arms 12 and 13 extending in opposite directions with respect to each other and having annular cutters 14 and 15, respectively, on the outer ends thereof for cutting an annular kerf 16 in a working face upon rotatable movement of said boring head and feeding movement of said boring head into the working face in the direction of the axis of rotation thereof. The boring head 10 is also shown as having a pilot cutter 17 adjacent the center thereof, for cutting a pilot kerf 18, which in the present form of boring head may be generally cylindrical in form. The kerfs 16 and 18 define the outer and inner margins of an annular core 19 extending toward the boring head in the space between the cutters 14, 15 and 17.

The arm 13 is shown in Figure 1 as having a yoke 22 projecting forwardly therefrom intermediate the ends thereof and forming a mounting for a roller disk 21, having a generally V-shaped face, engaging and rolling along the face of the core 19 and exerting a breaking action on the core, as the result of the pressure of the machine against the face of the seam during feeding movement of the mining head 10 thereof into the working face.

The arm 12 of the boring head 10 is shown in Figures 1 and 2 as having a reciprocating member 23 mounted thereon for reciprocating movement with respect thereto, in the direction of the axis of rotation of the boring head, and between the cutters 14 and 17. The forward end of the reciprocating percussive member 23 is in the general form of a yoke, and has a roller disk 24 rotatably mounted thereon, having a generally V-shaped periphery, percussively engaged with the coal face by the reciprocating member 23, to deliver impact blows to the core 19 and to roll thereabout upon rotatable movement of the boring head.

It may be seen with reference to Figure 2, that the boring head 10 has an inwardly extending hollow hub 25 journalled within the hollow hub 11 on a ball bearing 26. The hub 25 is shown as being keyed or otherwise secured to the forward end portion of a hollow drive shaft 27 extending within the frame for the machine and journalled within the hub 11 on roller axial thrust bearings 28. The hollow shaft 27 may be driven from a main motor for the continuous mining machine (not shown) through a usual form of drive geared reduction device, and forms no part of the present invention so not herein shown or described further.

The reciprocating percussive member 23 and breaker disk 24 are driven with a percussive action on principles similar to those shown and described in Patent No. 2,750,178, which issued to Robert A. McCallum on June 12, 1956. The percussive member 23 is slidably mounted in a boss 30, extending inwardly of the forward wall of the arm 12, and has a hollow inner end portion 31 extending within the piston rod end of a cylinder 32. The cylinder 32 is mounted at its piston rod end in a flanged inner end portion 33 of the hollow boss 30. The hollow inner end portion 31 of the member 23 is herein shown as being in the form of a piston rod secured to a piston 35 within the cylinder 32, as by machine screws 36. The inner end portion of the hollow inwardly extending portion 31 is shown as being threaded on a rotatable retractor shaft 37 for the piston 35, and the percussive core breaker disk 24. The retractor shaft 37 extends through a head 39 for the cylinder 32 and is held from axial movement with respect to said head and is journalled therein on ball bearings 40 mounted in said head. The ball bearings 40 may be axial thrust bearings and abut a sleeve 41 mounted on the retractor shaft 37. The sleeve 41 is interposed between the ball bearings 40 and a spaced bearing 42, which may also be an axial thrust bearing, and which is herein shown as being mounted within a driven member 44 of a friction disk clutch 45. A driving member 46 of the friction disk clutch 45 is shown as being journalled on an inwardly extending hub 47 of a gear case 48 on a ball bearing 49 and as having an external spur gear 50 formed integrally with the periphery thereof and meshing with and driven from a spur gear 51, keyed or otherwise secured to a shaft 53 parallel to the retractor shaft 37. The shaft 53 is journalled at its rear end in the gear case 48 and at its forward end in a rear wall 52 of the arm 12. The shaft 53 has a pinion 54 keyed or otherwise secured thereto meshing with a ring gear 55, shown as being formed integrally with the forward end portion of the hub 11 and traveling about and driven from said ring gear by rotation of said boring head about said hub.

The drive from the driven member 44 of the friction disk clutch 45 to the retractor shaft 37 is herein shown as being through a one-way over-running clutch 57, driving said shaft only in a direction to retractably move the piston 35 and core breaker disk 24 with respect to the cylinder 32. The one-way clutch 57 may be of any well known form and is not herein shown or described in detail, since it forms no part of the present invention, other than it provides a unidirectional drive to the retractor shaft 37. The one-way overrunning clutch 57, therefore, drives the retractor shaft to retract the piston 35 and accommodates free rotation of the retractor shaft 37 by the threaded connection between said piston and shaft, as the piston 35 is moved toward the piston rod end of the cylinder 32, as will hereinafter be more clearly described as the specification proceeds.

A secondary hydraulic pump 61 is mounted in the inner end wall of the gear casing 48, coaxially of the shaft 37 and is rotatably driven by said shaft through a one-way clutch 59 coupling the inner end of said shaft to a shaft 60 for the pump 61. The one-way clutch 59 is arranged oppositely of the one-way clutch 57, so that the auxiliary pump 61 will be driven through said one-way clutch to supply fluid under pressure, as the shaft 37 is rotated by extensible movement of the piston 35 along the cylinder 32. The purpose of the auxiliary pump 61 will hereinafter be more fully described as the specification proceeds.

A clutch collar 63 and clutch yoke 64 are provided to engage the friction disk clutch 45, to rotatably drive the retractor shaft 37 from the driving member 46 for the clutch. The clutch yoke 64 is herein shown as being pivotally connected to a yoke 65 on the end of a piston rod 66 extending within a hydraulic cylinder 67. A compression spring 69, seated within a cylindrical seat 70 in the inner side of the wall of the casing 48, is provided to bias the yoke 64 in a clutch engaging direction to effect a drive to the retractor shaft 37, except during the percussive stroke of the piston 35, at which time the clutch 45 is positively disengaged by the admission of fluid under pressure to the hydraulic cylinder 67, as will hereinafter be more clearly described.

The power for engaging the core breaker disk 24 with the coal face with a percussive action, is herein shown as being supplied by compressed air, supplied by an air pump or compressor 71, mounted within the casing 48 and by air compressed within the head end of the cylinder 32, upon retractable movement of the piston 35, by operation of the retractor shaft 37. The pump 71 is herein shown as being driven from the gear 55 through a pinion 73, meshing with said gear and mounted on the pump shaft. The pump 71 is connected with an air or accumulator tank 75 by a pressure line 76. The air tank 75 is shown in Figure 2 as being mounted within the hollow interior portion of the cutter arm 12. The air tank 75 charged with air by the air compressor 71 has communication with the head and piston rod ends of the cylinder 32 under the control of a tripper air control valve 81, through a pressure line 77 having a relief valve 79 therein and also having a check valve 80 downstream of the relief valve. The tripper air control valve 81, is herein shown as being a spool type of valve having a spool 82 therein, biased by a spring 83 to block the passage of air through a pressure line 84. The pressure line 84 is connected with the head and piston rod ends of the cylinder 32, through pressure lines 85 leading from the pressure line 84.

The valve spool 82 is moved to an open position to accommodate make up air to be supplied to the cylinder 32 by operation of a rod 86, herein shown as being the leg of a U-shaped rod, connected at the base of the U with the end of a rocking lever 87, through a rod 88 extending from the base of the U. The rocking lever 87 is pivoted intermediate its ends on a bracket 80 extending from the cylinder 32. The opposite end of the lever 87 from the rod 88 has a tripper plunger 89 pivotally connected thereto and extending through and slidably guided in the head end of the cylinder 32. A spring 90 encircles the plunger 89 and is seated at one end on the inside of the head end of the cylinder 32 and at its opposite end, on a head 91, on the inner end of the plunger 89.

Thus, as the piston 35 is retracted by rotation of the retractor shaft 37 and engages the head 91 of the tripper plunger 89 the valve 82 will open to admit air under pressure to the head end of the cylinder 32. Upon the release of the friction disk clutch 45 effected by the supply of hydraulic fluid under pressure to the cylinder 67, the piston 35 and core breaker disk 24 will be driven outwardly into engagement with the coal face with a percussive force by the air compressed in the head end of the cylinder 35.

Hydraulic fluid under pressure is supplied to the cylinder 67 to release the clutch 45 under the control of a tripper valve 100, operated upon operation of the valve 81. The source of hydraulic fluid under pressure includes a main hydraulic pump 95 mounted within the casing 48 and driven from the ring gear 55 through a pinion 96 meshing with said ring gear and keyed or otherwise secured to the pump shaft. The hydraulic pump 95 is connected with a fluid storage tank 93 through an intake line 97. A pressure line 99 leads from the pressure or output side of the pump 95 and is connected with the shut-off valve 100. The tripper valve 100 has a valve spool 101 biased into a closed position by a spring 102. The tripper valve 100 is like the tripper valve 81 and is operated by a rod 103, shown as being the other leg of the U from the rod 86. The valve spools 101 and 82 are thus moved to open positions together as the piston 35 engages the head 91 of the tripper plunger 89, to supply air to drive the breaker disk with a percussive action, and to supply fluid under pressure to the cylinder 67 to release the clutch 45.

A relief valve 106 is provided in the pressure line 99 and has connection with the tank 93 to return fluid thereto, through a return line 107. The auxiliary pump 61 driven by extensible movement of the member 23 is connected with the tank 93 through an intake line 94. Said pump 61 is connected with the cylinder 67 to supply fluid under pressure thereto, to release the clutch 45, by a pressure line 109 having a check valve 110 therein. A return line 111 having a bleed valve 112 therein is provided to return fluid from the head end of the cylinder 67 to the tank 93.

It may be seen from the foregoing, that as the boring head 10 is rotatably driven by the shaft 27, that the gear casing 48 will rotate about the hub 11, effecting a drive to the retractor shaft 37, the air pump 71 and the hydraulic pump 95 through the respective drive pinions therefor.

The clutch 45 being engaged by the spring 69, the shaft 37 will be driven in a direction to retract the piston 35 and cock the percussive member 23 and core breaker disk 24. As the piston 35 engages the head 91 of the tripper plunger 89 and effects opening of the valves 81 and 100, pressure will be supplied to the cylinder 67, to release the clutch 45, and will also be supplied to the head end of the cylinder 32 to force the piston 35, percussive member 23 and core breaker 24 into percussive engagement with the core, to shatter the core.

It should further be understood that the lead of the threads of the retractor shaft 37 is relatively flat, effecting a drive to said shaft by extensible movement of the piston 35 and member 23, and driving the auxiliary pump 61, to supply fluid under pressure to hold the friction disk clutch 45 disengaged as the valve 100 closes, as the piston 35 is released from the tripper plunger 89. As soon as the piston 35 and percussive member 23 reach the end of their travel the retractor shaft 37 will stop rotating. This will stop operation of the pump 61 and accommodate the spring 69 to engage the friction disk clutch 45, to again drive the retractor shaft 37 to retract the piston 35 and cock the percussive member 23, as long as the cutter head 10 is rotating about the hub 11.

An air chamber 113 is provided in the piston rod or forward end of the cylinder 32 to check the forward movement of the piston 35 and percussive member 23 and rotatable core breaker disk 24, in cases where the percussive member 23 may be fired at a time or place where no material is within reach of the breaker disk to absorb the energy.

During the firing action of the percussive member 23 and rotatable core breaker disk 24, where the percussive member 23 and breaker disk 24 may be fired into a cavity or depression in the working face, the breaker disk 24 traveling in an orbital path, will be engaged with the higher portions of the core as the head rotates. This will drive the piston 35 back upon the retractor shaft 37, causing said shaft to rotate faster than it is being driven by the clutch 45, and thereby overrunning the one-way overrunning clutch 57.

It should further be understood that the ratio of the gears driving the retractor shaft 37 is such that a normal cock and fire cycle will not occur in even increments of 360°. Where the additional cocking effect of a projecting core varies the length of a cocking and firing cycle, such that it becomes periodic, the machine may be backed away from the coal face momentarily, to overcome the effect of the projecting cores to assure that the "fire" portion of a cycle will coincide with one of the projecting cores, rather than a depression therein.

While I have herein shown and described one form in which my invention may be embodied, it may readily be understood that various modifications and variations of the invention may be effected without departing from the spirit and scope of the novel concepts of the invention.

I claim as my invention:

1. In a machine for fragmenting coal and the like from a solid working face, a boring head having spaced cutters projecting therefrom for cutting spaced kerfs in the working face and leaving an annular core therebetween, radially spaced percussive rolling core breakers carried by said boring head, at least one of said core breakers being mounted on said boring head between said cutters for reciprocable movement in the direction of the axis of rotation thereof, drive means driven by rotatable movement of said boring head for retractably moving said percussive core breaker and cocking said percussive core breaker for a percussive core breaking action out of phase with respect to each complete cycle of rotation of said boring head, and fluid pressure operated means controlled by rotation of said boring head for non-periodically firing said percussive core breaker in a core breaking direction.

2. In a rotary boring head for a continuous mining machine and the like, a support, a boring head rotatably mounted on said support having at least two radially extending boring arms having spaced cutters projecting therefrom for cutting concentric kerfs in a working face, a rotatable breaker disk mounted on one of said arms intermediate the ends thereof, and having a wedge shaped face adapted to have wedging engagement with the working face, a percussive member reciprocably mounted on the other of said arms and having a freely rotatable breaker disk on the end thereof, means driven by rotatable movement of said boring head for retracting said percussive member and breaker disk, to cock the same out of phase with respect to each complete cycle of rotation of said boring head, fluid pressure means for projecting said percussive member, fluid pressure operated control means controlled by rotation of said boring head for releasing said percussive member to be fired with an impact force out of phase with respect to each cycle of rotation of said boring head, and the power providing pressure for said fluid pressure means being supplied by rotatable movement of said boring head about said support.

3. In a continuous mining machine, a boring head mounted for rotation about a horizontal axis and having a pilot cutter and radially outwardly spaced cutter arm, for cutting concentric kerfs, a percussive core breaker slidably mounted on said boring head between said cutters for movement in the direction of the axis of rotation of said boring head, geared reduction means driven by rotatable movement of said boring head for retractably moving said percussive core breaker, said geared reduction means being so proportioned as to retractably move said percussive core breaker out of phase with respect to each complete cycle of rotation of said boring head, means dependent upon retractable movement of said percussive core breaker for releasing said percussive core breaker to be engaged with a working face with a percussive blow, comprising means driven by rotatable movement of said boring head for storing up fluid under pressure to project said percussive core breaker to engage the working face with an impact, and other fluid pressure means for releasing said percussive core breaker out of phase with respect to each cycle of rotation of said boring head.

4. In a continuous mining machine, a rotatable boring head, a percussive core breaker carried by said boring head for axial movement with respect thereto in the direction of rotation of said boring head, a cylinder mounted on said boring head, a piston within said cylinder, said percussive core breaker extending from said piston in advance of said cylinder and having a breaker disk mounted thereon for free rotation about an axis transverse to the axis of reciprocation of said core breaker, a retractor shaft having threaded engagement with said piston and core breaker, geared reduction means driven by rotation of said boring head for rotating said retractor shaft to retract said piston within said cylinder and to compress air therein, said geared reduction means being so proportioned as to retract said piston within said cylinder out of phase with respect to each cycle of rotation of said boring head and including a clutch, means biasing said clutch into an engaged position, a one-way drive connection between said clutch and said retractor shaft, for driving said shaft only in a direction to retract said piston within said cylinder, means biasing said clutch into an engaged position, a fluid pressure operated motor for releasing said clutch, a pump for supplying fluid under pressure to said motor, a tripper valve controlling the supply of fluid under pressure to said motor, a compressor supplying air under pressure to project said percussive core breaker to engage the working face with an impact force, a tripper air valve connecting said compressor with said cylinder, tripper means actuated by movement of said piston into its retracted position for simultaneously operating both of said tripper valves to release said clutch and effect the projection of said piston and core breaker member with an impact force out of phase with respect to each cycle of rotation of said boring head.

5. In a continuous mining machine, a rotatable boring head, a percussive core breaker carried by said boring head for axial movement with respect thereto in the direction of rotation of said boring head, a cylinder mounted on said boring head, a piston within said cylinder, said percussive core breaker extending from said piston in advance of said cylinder and having a breaker disk mounted on the end thereof, for free rotation about an axis transverse to the axis of rotation of said boring head, a retractor shaft having threaded engagement with said piston and core breaker, geared reduction means driven by rotation of said boring head for rotating said retractor shaft to retract said piston within said cylinder and to compress air therein, said geared reduction means being so proportioned as to retract said piston within said cylinder out of phase with respect to each cycle of rotation of said boring head and including a clutch, means biasing said clutch into an engaged position, a one-way drive connection between said clutch and said retractor shaft, for driving said shaft only in a direction to retract said piston within said cylinder, means biasing said clutch into an engaged position, a fluid pressure operated motor for releasing said clutch, a pump for supplying fluid under pressure to said motor, a tripper valve controlling the supply of fluid under pressure to said motor, a compressor supplying air under pressure to project said percussive core breaker to engage the working face with an impact force, a tripper air valve connecting said compressor with said cylinder, tripper means actuated by movement of said piston into its retracted position for simultaneously operating both of said tripper valves to release said clutch and effect the projecting of said piston and core breaker member with an impact force out of phase with respect to each cycle of rotation of said boring head, said tripper valves closing upon release of said tripper means by said piston, a fluid pump rotatably driven by rotation of said retractor shaft, effected by extensible movement of said piston, and having fluid connection with said motor to maintain pressure therein to hold said clutch released to the full end of the stroke of said piston and core breaker.

References Cited in the file of this patent
UNITED STATES PATENTS

| | | |
|---|---|---|
| 2,677,537 | Cartlidge | May 4, 1954 |
| 2,743,092 | Funk | Apr. 24, 1956 |
| 2,750,177 | Lindberg | June 12, 1956 |
| 2,750,178 | McCallum | June 12, 1956 |
| 2,823,025 | Biedess | Feb. 11, 1958 |

FOREIGN PATENTS

| | | |
|---|---|---|
| 135,179 | Great Britain | Mar. 7, 1921 |